United States Patent [19]

Swoager

[11] 3,793,966

[45] Feb. 26, 1974

[54] RESILIENTLY SUSPENDED RAILWAY VEHICLE

[75] Inventor: Jon R. Swoager, Imperial, Pa.

[73] Assignee: Automation Equipment, Inc., Imperial, Pa.

[22] Filed: Apr. 7, 1972

[21] Appl. No.: 241,975

[52] U.S. Cl................ 105/178, 105/63, 105/96.2, 105/136, 105/180, 105/364, 180/44 F, 295/41
[51] Int. Cl........ B61c 7/00, B61c 9/42, B61d 11/00
[58] Field of Search 105/4 R, 178, 179, 180, 182 R, 105/364 Z, 63, 96.2, 136, 364; 180/44 F; 295/41

[56] References Cited
UNITED STATES PATENTS

| | | | |
|---|---|---|---|
| 3,744,244 | 7/1973 | Swoager | 60/454 |
| 981,131 | 1/1911 | Spangler | 105/180 X |
| 1,256,558 | 2/1918 | Hild | 105/179 X |
| 867,999 | 10/1907 | Norwich | 105/178 |
| 1,576,298 | 3/1926 | Barbey et al. | 105/179 |
| 1,880,953 | 10/1932 | Fageol | 105/4 |
| 2,103,713 | 12/1937 | Dietrich | 105/180 X |
| 2,242,422 | 5/1941 | Eksergian | 105/182 R |

*Primary Examiner*—Robert G. Sheridan
*Assistant Examiner*—Howard Beltran
*Attorney, Agent, or Firm*—Yeager, Stein & Wettach

[57] ABSTRACT

A railway vehicle having independently suspended wheel assemblies and drive means: the suspension means includes a frame member transversely movable and pivotally mounted at its inboard end to the undercarriage of the vehicle. The frame member includes at its outboard end a trunnion in which a mounting plate is pivotably received. A motor is mounted to the inboard side of the plate and includes a shaft passing through an opening in the plate to which is secured a flanged wheel assembly. A tracked spring assembly is secured to the trunnion and outboard side of the undercarriage and is adapted for transverse and vertical movement with the frame member.

10 Claims, 11 Drawing Figures

RESILIENTLY SUSPENDED RAILWAY VEHICLE

FIELD OF THE INVENTION

The invention relates to an improved railway vehicle and, in particular to a railway vehicle having independently suspended wheel assemblies and drive means. The present invention is particularly well suited for use in mine railway vehicles.

BACKGROUND OF THE INVENTION

Railway vehicles generally are provided with an undercarriage to which the wheel assemblies and housings therefor are mounted. The wheel assemblies included at least a pair of flanged wheels connected together by an axle which is adapted for rotation with the wheels. The axles, usually at the outboard side of the wheels, are mounted in bearings which are fixed in the housings of the trucks. The trucks usually include a spring suspension means which is located between the housing and a transverse member which pivotally connects the truck to the undercarriage.

In smaller railway vehicles, particularly those used in the mines, the wheel housings are an integral part of or rigidly mounted to the vehicle. In some instances a spring suspension system is incorporated between the wheel bearing and housing. Also, these vehicles are self-driven by means of an electric motor which powers a shaft on which is located a number of sprocket means for transferring power to the axles by means of chains trained about sprockets mounted on the axles. The chain-sprocket drives have been, in some cases, substituted by pulley-belt drive means.

While these vehicles have been suitable for their intended purposes for many years, they have recently come under criticism due to the high noise levels associated with their operation. This has been particularly true with regard to those vehicles which are used within confined areas, for example, in underground mines. Because of the high noise levels associated with the operation of these latter vehicles, regulations have been adopted to limit the amount of noise to which a person working in their proximity may be exposed. For example, under the Federal Coal Mine Health and Safety Act of 1969, the permissible time duration to which a person may be exposed is extremely limiting: e.g. at noise levels of 90 dBA, an 8 hour exposure is permitted, at 95 dBA, 4 hours is permissible, at 105 dBA, 1 hour is permissible, and at 115 dBA, one-fourth or less hour is permissible. A typical mine personnel carrier, for example, operating at normal speeds produces a noise level of about 100 dBA; thus, under current standards, it would be impossible to carry personnel from the mouth of the mine to the face using such a car and not have chargeable noise time. Accordingly, presently available rail vehicles are unacceptable for use in mines under current federal standards.

Not only are currently available vehicles subject to extremely high noise levels, but they are subject to high wear and low hauling capacity. In the former instance, for example, where the vehicle must negotiate an arcuate section of track in which there is a gauge constriction, it is quite possible for the car to either jump the track or break its wheel flange because of its inability to negotiate or accommodate the constriction. In addition to either breaking the wheel flange or jumping the track, less severe constrictions result in the creation of very high and instantaneous noise levels which are caused by the abrading flange and track.

The present invention overcomes the disadvantages and objections associated with presently conceived railway vehicles. Not only are the noise levels associated with the operation of the vehicle substantially reduced, but accommodation to irregularities in track gauge is easily afforded by the present invention.

SUMMARY OF THE INVENTION

The present invention provides an articulated railway vehicle which has particular adaptability to usage in underground mines. The present invention also provides a novel wheel assembly as well as means for suspending and mounting the assembly. By means of the present invention a railway vehicle is possible with substantially reduced operation noise levels. The noise levels associated with operation of railway vehicles adapted for usage in the mines in accordance with the present invention is about 79–82 dBA.

Generally, a vehicle in accordance with the present invention includes independent suspension means for each wheel assembly. The suspension means comprises a frame member which is pivotably mounted at its inboard end to the undercarriage of the vehicle. Preferably, as well as being pivotally mounted, the mounting is transversely movable. The frame member also includes a trunnion at its outboard end in which a mounting plate is pivotably secured. The plate may at its outboard side include an axle to which a flanged wheel assembly may be rotatably mounted. However, if the car is to be powered, a motor, preferably hydraulic or hydrostatic, may be mounted to the inboard side of the plate. In this case the shaft of the motor passes through an opening in the plate provided therefor to which is secured the wheel assembly. The wheel assembly may include brake means, preferably a disc brake arrangement. The trunnion is attached to the outboard portion of the undercarriage by means of a spring and housing. If the frame member is mounted for transverse movement as well as being pivotal, then the spring housing is tracked to move transversely with the frame member.

Where the frame member is mounted for transverse movement, then it is preferable to include biasing means for outwardly urging the frame member and, thus the flanged wheel to the track. Also, the frame member is preferably adapted to be mountable at a number of locations along a transverse center line of the wheel assembly, thereby permitting the vehicle to accommodate many differently gauged tracks. By moving the mounting member accommodation can be made without the necessity of removing the axle and installing a smaller or larger one as is presently the case.

Moreover, the present invention is especially well suited for use in self-powered railway vehicles. In this case, motors may be provided for each wheel or less than all. Preferably, the motors are hydraulic and supplied by a common pump driven by an electric motor or gasoline or diesel engine. It is also possible to utilize electric motors for driving the wheels, but they are not preferred because they lack the controllability of the hydraulic motors and may necessitate special gearing.

The present invention is also particularly well suited for use in rail mass transit vehicles because of the ability to accommodate track irregularities to provide a smooth ride. Also, noise levels are well isolated from transmission to the body of the vehicle.

BRIEF DESCRIPTION OF THE DRAWINGS

Other advantages of the present invention will become apparent from a perusal of the following detailed description of a presently preferred embodiment taken in connection with the accompanying drawings in which.

DETAILED DESCRIPTION OF PRESENTLY PREFERRED EMBODIMENT

Figure 1:
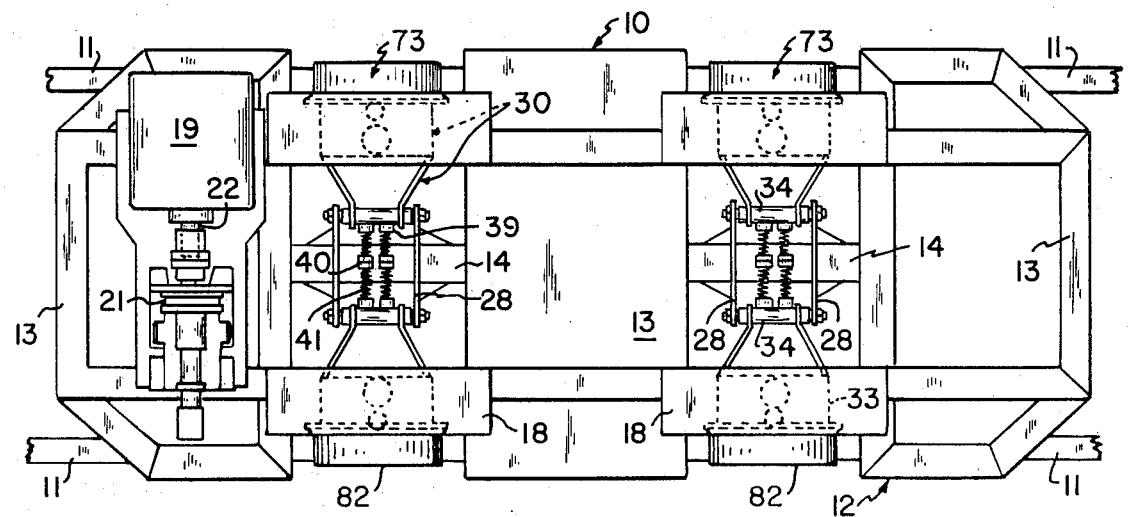
FIG. 1 is a top elevation of the framed undercarriage of a railway vehicle adapted for use in underground mining.
Figure 2:
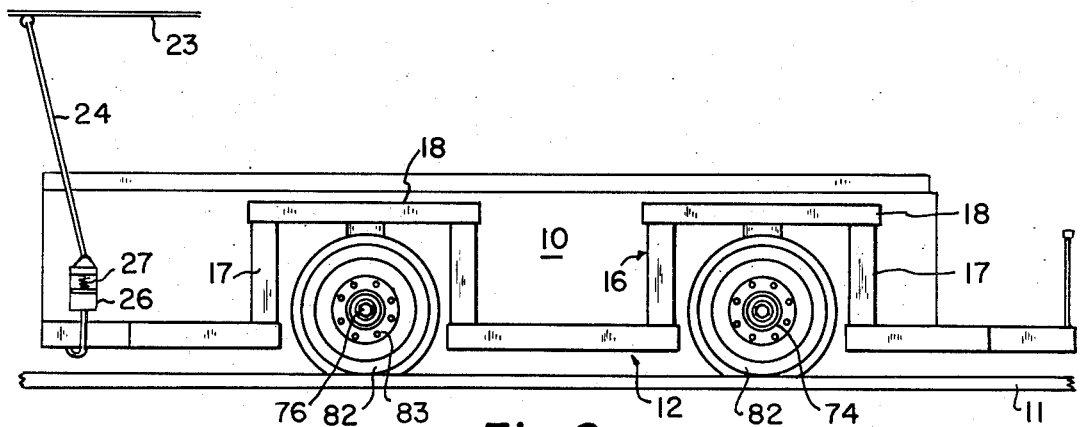
FIG. 2 is a side elevation of the framed undercarriage and body of the vehicle.
Figure 3:
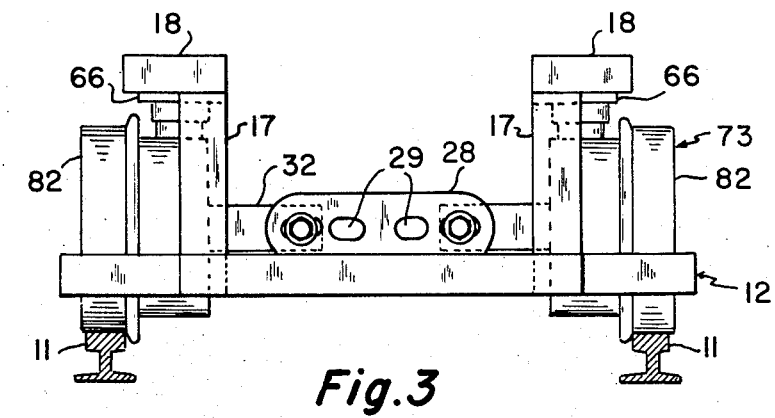
FIG. 3 is a front elevation of the undercarriage, wheel and suspension assembly.
Figure 4:
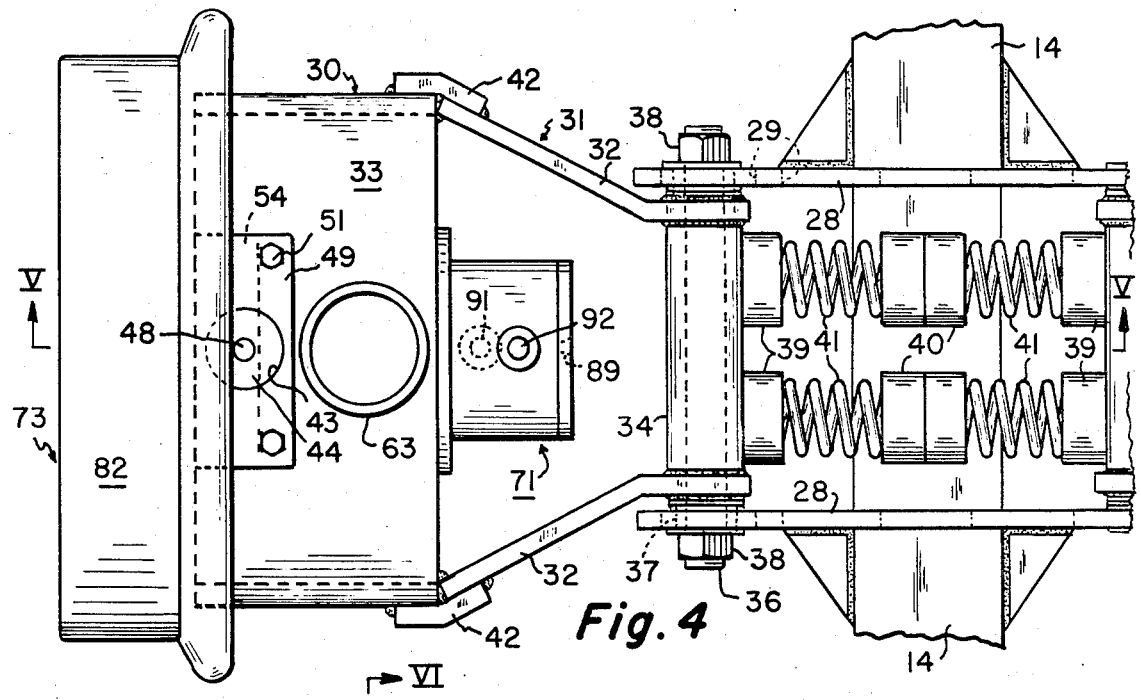
FIG. 4 is a top elevation of the wheel suspension assembly.
Figure 6:
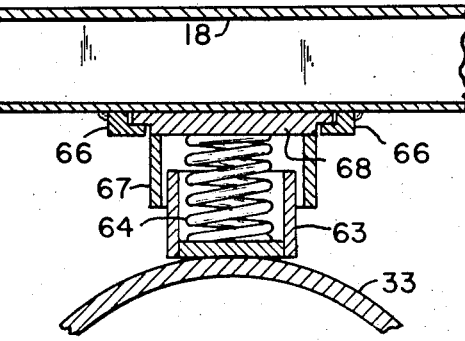
FIG. 6 is a section of the spring mounting assembly between the suspension and frame taken along line VI—VI of FIG. 5.
Figure 5:
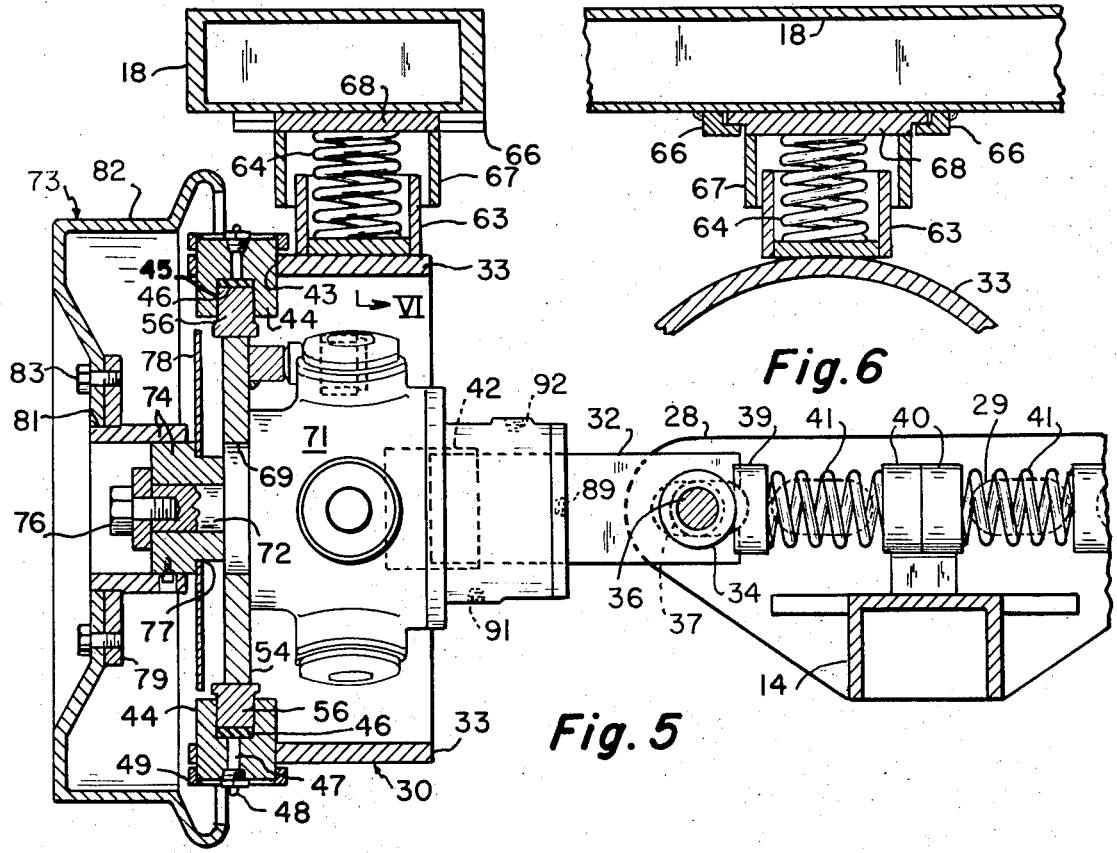
FIG. 5 is a section of the wheel suspension assembly and wheel assembly taken along line V—V of FIG. 4.
Figure 7:
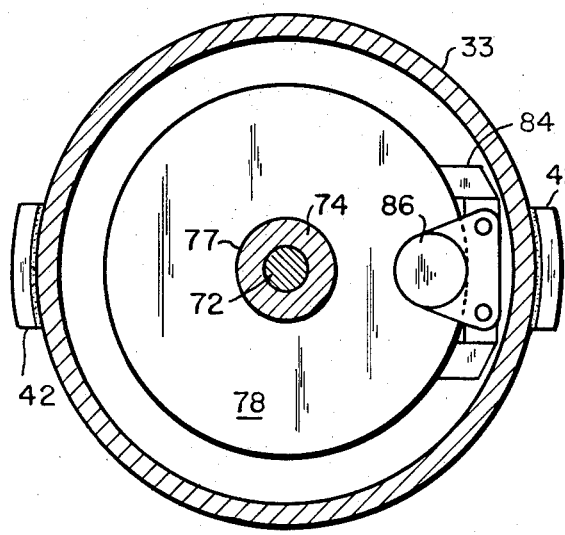
FIG. 7 is a sectional elevation of the trunnion and the disc brake assembly.
Figure 8:
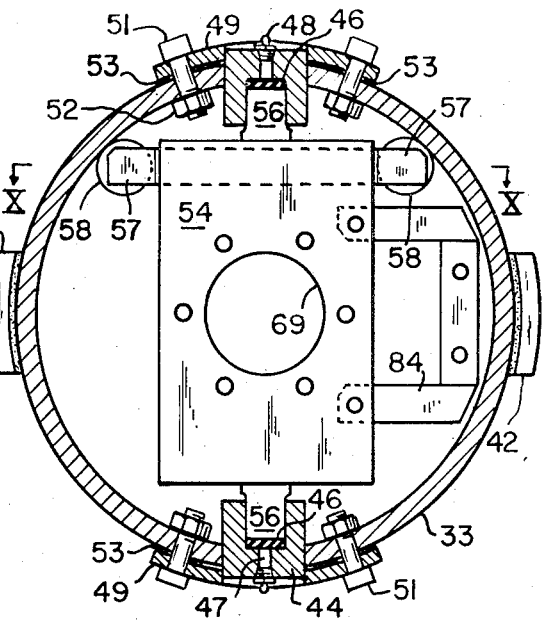
FIG. 8 is a sectional elevation of the trunnion, bearing members and motor mounting plate.

Referring to FIGS. 1 through 3, a railway vehicle 10 is shown adapted for travel upon rails 11. Vehicle 10 is of a type adapted for use in underground mining operations. Vehicle 10 may include an integral or unitized body with undercarriage or, preferably, includes an undercarriage 12 comprising a number of frame sections 13. Frame sections 13 can be of either the box-type construction, as shown, or can be of X-type construction, depending upon the amount of rigidity and strength required for the vehicle. Box frame sections 13 are connected by a pair of longitudinal frame members 14 located along the longitudinal center line of vehicle 10. Additional frame support assemblies 16 are preferably included to provide support to the wheel and wheel suspension assemblies as well as to provide rigidity to undercarriage 12. Support assemblies 16 include a pair of vertical frame members 17 and a horizontal frame member 18. As with frame sections 13, assemblies 16 are preferably made from heavy gauge channel or box stock and the frame members are preferably interconnected to provide an enclosed chamber. By constructing assembly 16 as an enclosed interconnected unit it is possible to use them as a reservoir for storage of hydraulic fluid, and thus eliminate the need for an additional or separate storage reservoir for the hydraulic fluid used in the drive means.

Mounted at one end of vehicle 10 is an electric motor 19. Motor 19 may be of either the A.C. or D.C. variety. In underground mining applications, it has been common to supply direct current and, therefore, motor 19 is of the D.C. type. Electric motor 19 is utilized to drive hydraulic pump 21 which is operably connected to motor 19 by means of shaft 22. Pump 21 is connected to motors 71 which are provided for each wheel. Electric power is supplied to the vehicle by means of cable 23. Electric power is transferred from the cable to motor 19 by a boom 24 which extends from the vehicle to cable 23, and includes either a slide or rotatable engaging means. Boom 24 is preferably biased against cable 23 by means of a hydraulically actuated cylinder 26 and by an additional spring biasing means 27. Spring 27 acts to maintain engagement by boom 24 with cable 23 when the vehicle is not in operation or when hydraulic pressure in cylinder 26 is not present. Spring 27 is also useful in absorbing any shock or accommodating any abrupt irregularities in the level of cable 23.

A pair of transverse carriage plates 28 are provided for each pair of wheel suspension assemblies 30. Preferably plates 28 are transversely mounted upon member 14 and are parallel to each other. Each pair of plates 28 includes a plurality of oppositely aligned slots 29. At least two pair of oppositely aligned slots are required for each pair of wheel suspension assemblies 30. Alternatively, a pair of carriage plates 28 could be provided for each wheel suspension assembly 30, but nO advantage is derived by so doing.

Each wheel suspension assembly 30 comprises a transverse A-frame 31 having a pair of offset arms 32. A trunnion 33 is provided at the outboard extension of arms 32 and a cylindrical pin holder 34 is provided at the inboard extension of arms 32. Preferably, arms 32 are parallel to each other at the inboard extension of the A-frame, and are spaced apart and adapted for engagement between carriage plates 28. The inboard extensions of arms 32 each include an opening (not shown) oppositely aligned from the other. Cylindrical holder and spacer member 34, preferably, includes a sleeve (not shown) made of teflon or the like material. Holder 34 is of a length substantially equal to the spacing between support arms 32 at their parallel inboard extensions. Holder 34 is rigidly mounted between arms 32 with its opening therethrough in communication with the openings in arms 32. A-frame 31 is positioned so that the openings in arm 32 and, thus, holder 34 are aligned with a pair of oppositely aligned slots 29 in plate 28. A pin 36 is then inserted through slots 29, holder 34 and/or its sleeve. Pin 36 is preferably of sufficient length to extend beyond carriage plate 28 in its fully inserted position, and is threaded at both of the extending portions. Bushings 37 are provided between pin 36 and the peripheral engaging portions of slot 29. Bushing 37 is included to substantially reduce the wear between slot 29 and pin 36 by the transverse movement of the A-frame within the slots. Pin 36 and bushing 37 are retained within the assembly by means of nuts 38 secured to the threaded end portions of pin 36.

Where only pivotal motion is needed in A-frame 31, slots 29 may be eliminated and only openings of a diameter sufficient to accommodate pin 36 are required. Bushings 37 are also eliminated and a pair of washers substituted. It would also be possible to eliminate carriage plate 28 and substitute therefor a solid bar having at least one opening therein for each wheel suspension assembly 30. In that case, the spacing at the parallel extension of arms 32 would be reduced to reduce the torquing effect that might otherwise be achieved. This alternative is not preferred, however, where a motor is associated with each assembly 30.

Where A-frame assembly 31 is adapted for transverse movement within slots 29, it is preferable to maintain frame 31 in an outwardly biased direction. Outward biasing can be provided, for example, by a spring biasing means which includes a pair of spaced apart cylindrical spring housings 39 mounted to holder 34. A pair of spring housings 40 are also mounted to longitudinal frame member 14. A pair of coil springs 41 extend between housings 39 and 40 to provide the outwardly extending biasing action. Housings 40 may each include two housing members positioned in a back-to-back relationship to one another to accommodate a pair of oppositely biasing springs 41. Alternatively, housings 40 may be omitted and springs 41 permitted to span between opposing housings 39 located on respective holders 34 of opposing wheel suspension assemblies 30. However, it is preferable to include housings 40 in order to reduce the length of springs 41. Accordingly, when opposing A-frames are moved inwardly by reason of wheel flanges engaging a constricted portion of track, assemblies 30 will move outwardly after removal of the constriction to retain wheel engagement with the track. Also, a track widening is accommodated by reason of the biasing.

At the outward extension of arms 32 is mounted a cylindrical trunnion member 33 which is rigidly fastened to arms 32 by means of mounting bracket 42. At the outboard end of trunnion 33 and along its vertical center line are a pair of openings 43 which are adapted to receive cylindrical female bearing members 44. Bearing members 44 include a machined inner bearing surface 45. A resilient member or pad 46, preferably of a rubber material, is positioned on the horizontal land of surface 45. A passageway 47 is provided for communication between grease fitting 48 and surface 45. Preferably, bearing 44 extends through trunnion 33 and is retained in opening 43 by means of bearing cap 49. A pair of openings are placed in trunnion 33 and cap 49 for the purpose of receiving bolt 51 and nut 52 to secure the cap to trunnion 33. In order to avoid preloading of the bearing, shims 53 are placed between the trunnion and bearing cap 49 at the bolt pass-through location.

A motor mounting plate 54 having a pair of male bearing members 56 is positioned within trunnion 33. Male bearing members 56 engage bearing surfaces 45 and resilient pad 46. Plate 54 is, therefore, adapted to pivot about the center line of the respective bearings. Since the wheel assembly 73 is mounted to plate 54, it will also pivot with the plate. By rendering the wheel assembly pivotal, minor irregularities in the track can be accommodated without the creation of excessively high noise levels associated with standard railway vehicles. This is particularly the case during the negotiation of an arcuate section of track. The wheels can assume the arc and provide a smooth transition therethrough. In fixed wheel assemblies of present vehicles, the wheels must negotiate the arc in a straight ahead, parallel manner, and, consequently, create high abrasion noise between wheel flanges and track.

Figure 9:
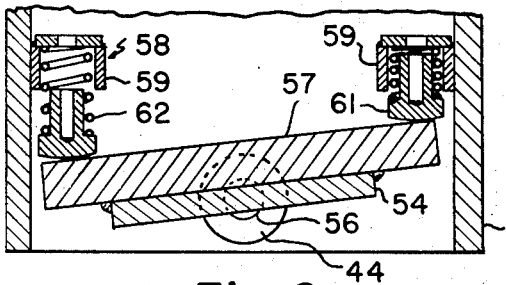
FIGS. 9 and 10 are sections taken along line X—X of FIG. 8.
Figure 10:
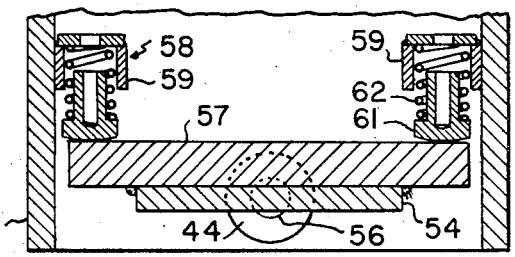

Since it is preferable to restrict rotation to protect the motor and wheel assembly to within an arc of about 12° to 15°, stop arms 57 are mounted to the inboard side of plate 54 and are adapted to engage shock absorbers 58, see FIGS. 9 and 10. Shock absorbers 58 each include a spring housing 59 eccentricallY attached to the interior of trunnion 33 and behind arms 57. Movably mounted within housing 59 is a T-member 61 having an interior land adapted to engage the peripheral end portion of coil spring 62. The other end opening 62 engages the bottom of housing 59. The exterior top portion of T-member 61 is preferably machined to an arcuate surface for smooth and continuous engagement with arm 57. Shock absorber 58 not only acts to limit the pivotal movement of plate 54 but also acts to bias the plate in a vertical plane perpendicular to the vertical center line plane of wheel suspension assembly 30.

At the inboard end of trunnion 33, and along the same transverse center line as opening 43, is mounted a lower spring housing 63. Lower spring housing 63 is adapted to engage and hold suspension spring 64. A pair of oppositely facing L-shaped rail members 66 are transversely mounted to frame member 18 and extend, preferably, the length of wheel suspension assembly 30. An upper spring housing 67 is secured to a spring mounting plate 68. Upper housing 67 preferably has an interior diameter slightly larger than the outer diameter of housing 63 to permit lower housing 63 to move within the upper housing 67 during flexing of spring 64. At its upper end, spring 64 is mounted to mounting plate 68 and housing 67. Plate 68 includes a pair of lands for engaging the horizontally inwardly extending lands of rails 66 to permit the upper spring assembly to transversely move along the rails with A-frame 31. This permits the entire trunnion 33 or wheel suspension assembly 30 to move transversely in slots 29 and yet retain a suspension mounting with frame member 18.

Mounting plate 54 is provided with an opening 69. A hydraulic or hydrostatic motor 71 is mounted at the inboard side of plate 54. Motor 71 is preferably a low speed high torque hydraulic motor having a stationary housing or rotating shaft. Motor 71 includes a shaft 72 which passes through opening 69. Wheel assembly 73 includes an annular support hub 74 mounted to shaft 72 by means of bolt 76. Support hub 74 includes an annular land 77 at the inboard end which is adapted to support and position brake disc 78. Support hub 74 also includes an outboard extension to which is mounted a circular wheel mounting member 79. Member 79 is mounted so as to provide the hub with an annular land 81 between the mounting member 79 and the outboard end of the hub. A flanged wheel member 82 is bolted to mounting member 79 by means of bolt 83 and is adapted to be nested upon land 81.

In the case where no motor 71 is to be utilized, opening 69 is omitted and a rotatable shaft substituted therefor. Bolt 76 would be used for mounting wheel assembly 73 thereto. If braking means were required, the same arrangement as where the wheel is powered could be utilized.

A caliper mounting bracket 84 is secured to plate 54 to which caliber 86 is mounted. Caliper 86 is adapted to engage disc 78 upon application of hydraulic pressure to brake assembly 86.

Figure 11:
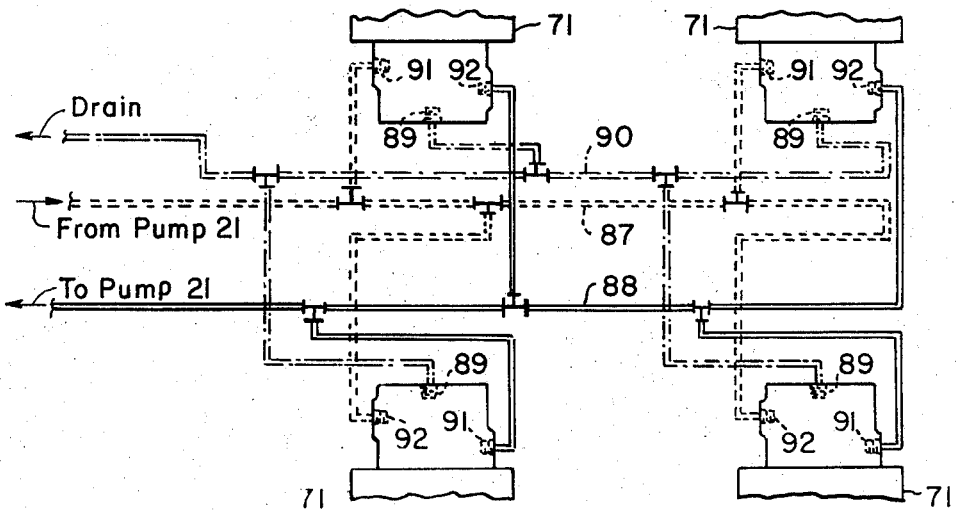
FIG. 11 is a schematic of the hydraulic system for operation of the motors.

Referring to FIG. 11, there is schematically illustrated a closed circuit hydrostatic drive. In such a system a positive displacement pump 21 and motor transfer rotary power means 71 are connected inlet-to-outlet to form a closed loop for flow of hydraulic fluid. During typical operation of the system, large quantities of hydraulic fluid are drained from the system for the purpose of introducing fresh cool fluid to maintain proper temperature within the system.

As shown, pump 21 feeds through high pressure line 87 hydraulic fluid to inlet ports 91 of motors 71. From outlet ports 92 is a low pressure line 88 back to pump 21. Drains 89 are connected by line 90 to a reservoir (assembly 16). However, since the replenishing of fluid to the closed circuit is a possible source of contamination of the fluid, a filtration system is usually required. Preferably, therefore, a system such as described in U.S. application Ser. No. 167,580, filed July 30, 1971, now Pat. No. 3,744,244, issued July 10, 1973 entitled "Hydrostatic Drive", by the inventor of the present invention is used.

While a presently preferred embodiment of the invention has been described and shown in particularity, it may otherwise be embodied within the scope of the appended claims.

What is claimed is:

1. In a railway vehicle having an undercarriage, the improvement comprising a wheel assembly means and suspension therefor, said suspension means including a frame member mounted at its inboard end to the vehicle undercarriage by pivot means for pivotal movement about a horizontal axis, said frame member including at its outboard end a trunnion member; a mounting plate pivotally mounted within said trunnion; a flanged wheel assembly rotatably mounted to the outboard side of said plate; and a suspension spring means mounted between said trunnion and the outboard side of said vehicle undercarriage.

2. The improvement set forth in claim 1 wherein said pivot means is mounted to be movable in a direction transverse to the longitudinal center line of the vehicle.

3. The improvement set forth in claim 2 wherein said suspension spring means includes a means for transverse movement between said trunnion and undercarriage.

4. The improvement set forth in claim 1 wherein a motor is mounted to the inboard side of said plate, said plate including an opening through which the shaft of said motor passes for connection with said flanged wheel assembly.

5. In a railway vehicle having an undercarriage, the improvement comprising an independent suspension and wheel assembly and drive means therefor, said suspension means including a frame member mounted at its inboard end to the vehicle undercarriage by pivot means for pivotal movement about a horizontal axis, said frame member including at its outboard end a trunnion member; a mounting plate pivotally mounted within said trunnion and including an opening therethrough; a motor mounted to the inboard side of said plate and having a shaft extending through said opening; a flanged wheel assembly mounted to said shaft and adapted for rotation therewith; and a suspension spring means mounted to and between said trunnion and the outboard portion of the vehicle undercarriage.

6. The improvement set forth in claim 5 wherein said pivot means is mounted for transverse movement, and where said suspension spring means includes mounting means transversely movable with respect to said undercarriage.

7. The improvement set forth in claim 6 which further comprises spring means for outwardly biasing said pivot member.

8. The improvement set forth in claim 7 wherein said trunnion member includes a pair of opposing aligned bearing means each including a horizontal land and mount along the vertical axis of the trunnion, where the mounting plate includes a pair of mating bearings adapted to pivotally engage said bearing means, and a resilient member adapted to fit between the horizontal lands and the mating bearing.

9. The improvement set forth in claim 7 wherein said wheel assembly includes a brake disc between the flanged wheel and the mounting plate and adapted for rotation with the shaft, and a brake caliper adapted to engage said disc and mounted to said mounting plate.

10. The improvement set forth in claim 9 wherein said mounting plate includes a horizontal arm extending passed the plate on both sides and said trunnion includes a pair of eccentrically mounted biased limit means adapted to continuously engage said arm at its extension.

* * * * *